United States Patent
Rodriguez Robles et al.

(10) Patent No.: US 12,091,186 B2
(45) Date of Patent: Sep. 17, 2024

(54) METHOD FOR DETECTING A PHYSICAL STATUS OF A FLEXIBLE STRUCTURE

(71) Applicant: Airbus Defence and Space SAU, Getafe (ES)

(72) Inventors: Rodney Rodriguez Robles, Getafe (ES); Pablo Pingarrón Zapardiel, Getafe (ES); Francisco José Asensio Nieto, Getafe (ES)

(73) Assignee: Airbus Defence and Space SAU, Getafe (ES)

( * ) Notice: Subject to any disclaimer, the term of this patent is extended or adjusted under 35 U.S.C. 154(b) by 212 days.

(21) Appl. No.: 17/694,746

(22) Filed: Mar. 15, 2022

(65) Prior Publication Data

US 2022/0297849 A1   Sep. 22, 2022

(30) Foreign Application Priority Data

Mar. 17, 2021   (EP) .................... 21382211

(51) Int. Cl.
  *B64D 39/06*   (2006.01)
  *B64D 39/00*   (2006.01)
  *B64D 39/04*   (2006.01)
  *G01M 5/00*   (2006.01)
  *G01M 9/06*   (2006.01)

(52) U.S. Cl.
  CPC ............. *B64D 39/06* (2013.01); *B64D 39/00* (2013.01); *B64D 39/04* (2013.01); *G01M 5/00* (2013.01); *G01M 9/06* (2013.01)

(58) Field of Classification Search
  CPC ........ B64D 39/06; B64D 39/00; B64D 39/04; G01M 5/0025; G01M 5/00; G01M 9/06; G01M 5/0041; G01M 5/0066
  See application file for complete search history.

(56) References Cited

U.S. PATENT DOCUMENTS

2016/0311554 A1   10/2016   Marcos Montes et al.
2018/0088000 A1   3/2018   Asensio Nieto et al.

FOREIGN PATENT DOCUMENTS

EP   3088304 A1   11/2016
EP   3299790 A1   3/2018

OTHER PUBLICATIONS

European Search Report; priority document.
F. Arevalo Lozano et al., "Aeroelastic Role in the Road to a Fully Automated Refuelling System" Structural Dynamics and Aeroelasticity Department, Airbus Defence and Space, International Forum on Aeroelasticity and Strucural Dynamics, Jun. 2019, Savannah, GA USA.

(Continued)

*Primary Examiner* — Lisa M Caputo
*Assistant Examiner* — Cynthia L Davis
(74) *Attorney, Agent, or Firm* — Greer, Burns & Crain, Ltd.

(57) ABSTRACT

A method in the field of flight control laws (CLAWs) used to control a flexible structure, for example an air to air refueling flying boom system, the method detecting the physical status determined by exogenous boundary conditions acting on the flexible structure. A computer program is provided which carries out the method for detecting the physical status of a flexible structure. A system and aircraft comprising such a flexible structure are also provided.

14 Claims, 2 Drawing Sheets

(56) References Cited

OTHER PUBLICATIONS

K. Salehi Paniagua et al., "Aeroelastic Analysis of an Air-to-Air Refueling Hose-Drogue System Through an Efficient Novel Mathematical Model" Journal of Fluids and Structures 2021, Department of Aircraft and Space Vehicles, Getafe, Spain and Structural Dynamics and Aeroelasticity Department, Airbus Defence and Space, Getafe, Spain.

Y. Xie et al., "Deployment Process Control of Space Masts via Iterative Learning Control" Shanghai Key Laboratory of Intelligent Manufacturing and Robotics, Shanghai University, Shanghai Key Laboratory of Spacecraft Mechanism and Shanghai Institute of Aerospace System Engineering, Shaghai, China.

METHOD FOR DETECTING A PHYSICAL STATUS OF A FLEXIBLE STRUCTURE

CROSS-REFERENCES TO RELATED APPLICATIONS

This application claims the benefit of the European patent application No. 21382211.7 filed on Mar. 17, 2021, the entire disclosures of which are incorporated herein by way of reference.

FIELD OF THE INVENTION

The present invention belongs to the field of flight control laws (CLAWs) used to control a flexible structure, for example an air to air refueling flying boom system, specifically to a method for detecting the physical status determined by the exogenous boundary conditions acting on this flexible structure.

The present invention is also related to a computer program which carries out the method for detecting the physical status of a flexible structure, as well as to a system and aircraft comprising such a flexible structure.

BACKGROUND OF THE INVENTION

Currently, an Air to Air Refueling (AAR) flying boom system comprises a telescoping tube with flight control surfaces. The telescoping tube, comprises a telescopic beam with the capacity to be extended telescopically to make the physical connection with the receptacle of a receiver aircraft, carrying out in this manner the transfer of fuel from the tanker aircraft to the receiver aircraft.

For the specific case of the flying boom system, the air refueling operator (ARO) needs to fly the boom and extend and insert the nozzle located at the end of the telescopic beam into the receiver Universal Aerial Refueling Receptacle System Installation (UARRSI). Once the nozzle has made contact, latches in the UARRSI of the receiver aircraft are triggered and closed to ensure that the nozzle is properly locked during the fuel transfer.

The flight control laws (CLAWs) of flying boom systems embodied on the aerial refueling boom system itself have different and specific feedback filtering modes for "free-movement" (no contact) or "restricted-movement" (contact) physical status, denoted "free-flight" and "coupled" filtering modes respectively (CLAWs filtering modes).

These CLAWs filtering modes are designed to eliminate the elastic modes components present in the feedback signals that contain the measured dynamics of the flexible structure.

In general, the elastic modes characteristics of the flexible structure (elastic modes frequencies and elastic modes shapes) strongly depend on the exogenous boundary conditions acting on the flexible structure. The elastic modes in "free-movement" physical status are completely different from the elastic modes of the flexible structure when it is physically in "restricted-movement" or "coupled" condition, and thus a specific filtering mode for each condition is required in the flight control laws (CLAWs). Therefore, in order to have a well performing and smooth control during every phase of the refueling operation, an automatic system is needed to detect the restricted-movement condition to commute from the "free-flight" filtering mode to the "coupled" filtering mode and vice versa.

The need to identify the actual physical status of the mentioned flexible structure (which is determined by the exogenous boundary conditions) is therefore essential for aerial refueling operations with a flying boom system. Failure to detect the actual physical status of the flying boom may lead to the unintentional activation of an inadequate filtering mode of the flight control laws (CLAWs), leading to handling qualities degradations or even unstable aeroservoelastic coupling phenomenon, i.e., divergent oscillatory loads that can ultimately cause the breakage of the flying boom structural components.

The current state-of-the-art refers to a method to detect the physical status (free-movement or restricted-movement status) of the flying boom. This method is based on the generation and detection of a pulse signal generated when the induction coil of the receiver receptacle is aligned with the induction coil of the nozzle once the nozzle is properly mated. Once this electrical pulse is received and recognized by the flying boom, the flight control laws (CLAWs) filtering modes are switched from "free-flight" to "coupled" status, and vice versa, based on the connection or disconnection signal received.

This method suffers from Filtering Mode Mismatch (FMM) drawbacks, that is, the flight control laws (CLAWs) might be in a filtering mode which is incoherent with the actual physical status of the flexible structure, the flying boom.

The Filtering Mode Mismatch condition is triggered when one of the following events occurs:

Nozzle cocking: The flight control laws (CLAWs) are in the "free-flight" filtering mode, and the flying boom's nozzle tip rests within the receiver's receptacle, but the boom is not properly seated in the receptacle. Thus, the structure movement is constrained due to a wrong alignment of the flying boom with the receiver receptacle whereas the flight control laws (CLAWs) filtering mode is not coherent with the mentioned physical constraint.

Undetected "contact": The flight control laws (CLAWs) are in "free-flight" filtering mode and the boom nozzle is inside of the receptacle properly latched, but there has been a coil signal failure, i.e., failure to recognize the pulse generated by the induction coil, failure to generate the pulse from the induction coil, or latches have been jammed in a closed position, while the flight control laws (CLAWs) have transitioned to "free-flight" filtering mode, even though the boom nozzle remains latched to the receiver receptacle.

Undetected "float-out": The flight control laws (CLAWs) are in "coupled" filtering mode, but the structure is in a "free-movement" physical status, due to the fact that the boom nozzle has exited the receiver's receptacle as a result of an un-latched condition, generating a boom "float-out".

Such mismatches may cause structural damage to the mentioned flexible structure, particularly the flying boom structure, as the flight control laws (CLAWs) are using a filtering mode for the controller's feedback signals which does not correspond with the actual physical status of the flexible structure, and thus, the flying boom does not behave as it should as its flexible structure is being incorrectly controlled by the flight control laws (CLAWs).

The present invention provides a method of detection of the physical status of a flexible structure that shall be applied on an air to air refueling boom system during a refueling operation in the event of failure to transmit or to recognize the coil signal used during such refueling operation. That is, the method of detection of the physical status of a flexible structure provides a result which allows knowing if the actual physical status of the flexible structure is coherent or not with the filtering mode of the flight control laws. Thus, the present invention solves the different failure casuistry related to Filtering Mode Mismatch conditions, rendering a more robust flight control system.

SUMMARY OF THE INVENTION

In a first inventive aspect, the invention provides a method for detecting a physical status of a flexible structure, the status being either free-movement or restricted-movement, the flexible structure having time-varying elastic characteristics, with a total number $N \in \mathbb{N}^+$ of elastic modes, being i a generic elastic mode, $i \in \mathbb{N}^+: i \in [1, N]$, and the flexible structure being controlled by flight control laws (CLAWs), these CLAWs comprising specific filtering modes for free-movement or restricted-movement status.

Throughout all this document, a flexible structure will be understood as a structure which is defined by means of time-varying elastic characteristics, the characteristics depending on the geometry and shape of the flexible structure itself. Thus, the flexible structure is characterized by fast time-varying geometries and exogenous boundary conditions that can suffer discrete changes, as well as elastic variable characteristics.

That is, for example, when a structure is able to change its length along time, the elastic characteristics vary according to the current value of such length.

Such flexible structure is controlled by means of flight control laws (CLAWs), these CLAWs comprising specific filtering modes for "free-movement" and for "restricted-movement" physical status of the flexible structure.

These specific filtering modes, which are applied to the feedback control signals containing the measured dynamics of the flexible structure, are enabled or disabled according to the estimated physical status of the flexible structure.

Thus, in a particular embodiment, the present method of detection shall be applied on an air to air refueling boom system as flexible structure, during a refueling operation, in the event that the coil signal normally used during such refueling operation fails to be generated, transmitted or recognized.

That is, the method of detection of the physical status of a flexible structure provides a result which allows knowing if the physical status of the flexible structure is incoherent with the flight control laws' (CLAWs) filtering mode.

Particularly, throughout all this document, two different physical statuses for the flexible structure will be defined, namely:

Free-movement status: the flexible structure has no constraints on one of its ends, as it is not coupled to any additional structure.

Restricted-movement status: the flexible structure is coupled with an additional structure, and thus its movement is conditioned by the restrictions imposed by the coupling (exogenous boundary conditions and holonomic constraints).

The flight control laws (CLAWs) filtering modes are defined according to the aforementioned statuses, such that there are filtering modes which are designed to be used when the structure is in the free-movement status, and filtering modes which are designed to be used when the structure is in the restricted-movement status.

The method of the first inventive aspect comprises several steps, namely:

a) sampling a first and a second discrete-time scalar signals $y^A$ and $y^B$ containing the measured dynamics of the flexible structure, being $y_n^A$ and $y_n^B$ the $n^{th}$ sample of the respective signal provided by a first and second active measurement source, this sampling being performed with a sample time $\Delta t$, and the $n^{th}$ sample of a signal being $n \in \mathbb{N}^+: n \in [1, \infty)$, The discrete-time signals, present in step a) of the method, measure the dynamics of a flexible structure which comprises a total number N of elastic modes and, advantageously, these signals are obtained by means of only two active measurement sources, e.g., sensors, namely the first (A) and second (B) active measurement sources.

These active measurement sources are located along the flexible structure and indistinctly provide discrete measures of the flexible structure dynamics. These active measurement sources can be angular orientation measurement units or angular rate measurement units, such as angular orientation sensors or angular rate sensors.

The method for detecting a physical status of a flexible structure further comprises the step of:

b) obtaining from the first and second $y_n^A$ and $y_n^B$ sampled signals the following signals:
first elastic mode (i=1) estimated activity signal $\hat{\gamma}_n^{1F}$ in free-movement status,
first elastic mode (i=1) estimated activity signal $\hat{\gamma}_n^{1R}$ in restricted-movement status, Once the mentioned measurements have been performed, and the first and second $y_n^A$ and $y_n^B$ sampled signals have been obtained, step b) of the present method obtains, from the previous signals, the estimated activity of the first elastic mode (i=1) for both the free-movement status and the restricted-movement status simultaneously. The $n^{th}$ sample of these estimated activity signals are denoted by $\hat{\gamma}_n^{1F}$ and $\hat{\gamma}_n^{1R}$ respectively.

The signals are used for the computation of the probability of the flexible structure to be in a restricted-movement status (i.e., when the exogenous boundary conditions limit the movement of the flexible structure). For example, when the flexible structure is a flying boom of a tanker aircraft, the present obtained signals allow the computation of the probability of the flying boom to be coupled or in contact with the slipway of the receptacle of a receiver aircraft.

c) obtaining the estimated isolated free-movement and restricted-movement first elastic mode excitation signals, $\hat{\varepsilon}_n^{1F}$ and $\hat{\varepsilon}_n^{1R}$ respectively from the signals $\hat{\gamma}_n^{1F}$ and $\hat{\gamma}_n^{1R}$, by means of a first and second notch filters, where $\hat{\varepsilon}_n^{1F}$ and $\hat{\varepsilon}_n^{1R}$ are:

$$\hat{\varepsilon}_n^{1F} = NF_F \hat{\gamma}_n^{1F},$$

$$\hat{\varepsilon}_n^{1R} = NF_R \hat{\gamma}_n^{1R},$$

wherein $NF_F$ and $NF_R$ denote the discrete transfer functions of notch-filters.

According to step c) of the method, these computed input signals are conditioned by means of notch filters, preferably parametric filters, to avoid interferences between elastic modes. The notch filters are designed such that the first elastic mode (i=1) estimated activity signals $\hat{\gamma}_n^{1F}$ and $\hat{\gamma}_n^{1R}$ are completely attenuated at frequencies $\hat{\omega}_n^{1R}$ and $\hat{\omega}_n^{1F}$ respectively, which are defined as:
$\hat{\omega}_n^{1F}$ referring to the first elastic mode (i=1) estimated frequency in free-movement status,
$\hat{\omega}_n^{1R}$ referring to the first elastic mode (i=1) estimated frequency in restricted-movement status.

Outputs obtained from step b) are conditioned using the digital notch filters introduced above in order to eliminate the cross elastic mode component residues which might be still present in the first elastic mode (i=1) estimated activity signals $\hat{\gamma}_n^{1F}$ and $\hat{\gamma}_n^{1R}$.

As a result, estimations of the isolated first elastic mode excitation assuming free-movement and restricted-movement statuses are obtained by means of computation, respectively $\hat{\varepsilon}_n^{1F}$ and $\hat{\varepsilon}_n^{1R}$.

Additionally, the method according to this first inventive concept further comprises:

d) estimating the amplitude $\|\hat{\varepsilon}_n^{1F}\|$ and $\|\hat{\varepsilon}_n^{1R}\|$ of the isolated elastic mode excitation signals $\hat{\varepsilon}_n^{1F}$ and $\hat{\varepsilon}_n^{1R}$ by amplitude demodulation, Based on the outputs of step c), present step d) provides a smooth estimate of the amplitude of the estimated isolated free-movement and restricted-movement first elastic mode excitation signals, $\hat{\varepsilon}_n^{1F}$ and $\hat{\varepsilon}_n^{1R}$ by means of an amplitude demodulation technique.

In a particular embodiment, this amplitude demodulation of step d) is performed with a third parametric notch-filter applied to the signal $\hat{\varepsilon}_n^{1F}$ with a notch frequency of $2\hat{\omega}_n^{1F}$ and a fourth parametric notch-filter applied to the signal $\hat{\varepsilon}_n^{1R}$ with a notch frequency of $2\hat{\omega}_n^{1R}$, wherein the estimated amplitudes are computed as:

$$\|\hat{\varepsilon}_n^{1F}\| = \sqrt{2(\hat{\varepsilon}_n^{1F})^2 NF(z^{-1}; 2\hat{\omega}_n^{1F})},$$

$$\|\hat{\varepsilon}_n^{1R}\| = \sqrt{2(\hat{\varepsilon}_n^{1R})^2 NF(z^{-1}; 2\hat{\omega}_n^{1R})},$$

wherein NF is the discrete transfer function of the parametric third and fourth notch-filters in the $z^{-1}$ plane.

Once the estimated amplitude of the estimated isolated free-movement and restricted-movement first elastic mode excitation signals, $\|\hat{\varepsilon}_n^{1F}\|$ and $\|\hat{\varepsilon}_n^{1R}\|$ are obtained, the method of the first inventive aspect comprises the following steps, based on recursive computations, which provides results on samples based on the results of the immediately previous sample.

Moreover, the method according to this first inventive concept further comprises:

e) recursively computing the estimated probability $P_n^R$ of the flexible structure to be in a restricted-movement status, wherein $P_n^R \in \mathbb{R} \in [0, 1]$ and is defined as:

$$P_n^R = \max(0, \min(1, P_{n-1}^R + (\lambda \cdot U_n))),$$

wherein $\lambda$ is an update gain constant being $\lambda > 0$, and $P_{n-1}^R$ is a previous value of the estimated probability of the flexible structure in a restricted-movement status at the $(n-1)^{th}$ sample, wherein when n=1; then $P_{n-1}^R = 0$, being the step e) of the method applied for the first time, wherein $U_n$ is defined as follows:

$$U_n = (\|\hat{\varepsilon}_n^{1F}\| - \|\hat{\varepsilon}_n^{1R}\|)^2 P_{n-1}^R - \|\hat{\varepsilon}_n^{1R}\|(\|\hat{\varepsilon}_n^{1F}\| - \|\hat{\varepsilon}_n^{1R}\|),$$

According to the present step, the estimated probability $P_n^R$ obtained is that referred to the flexible structure being in a restricted-movement status.

Finally, the method of the first inventive aspect provides the following result, in order to detect the physical status of the flexible structure.

f) detecting the physical status of the flexible structure by recursively computing a discrete state Boolean signal $R_n$ at the $n^{th}$ sample, wherein $R_{n-1}$ is a previous value of the discrete state Boolean signal at the $(n-1)^{th}$ sample, wherein when n=1, being step g) of the method applied for the first time, then $R_{n-1}$=false, being the flexible structure in free-movement status, and the discrete state Boolean signal $R_n$ being recursively computed as follows:

if $P_n^R \geq p_R$ and $R_{n-1}$=false, then $R_n$=true being the flexible structure in the restricted-movement status, otherwise $R_n$=false or if $P_n^R \leq p_F$ and $R_{n-1}$=true, then $R_n$=false being the flexible structure in the free-movement status, otherwise $R_n$=true.

wherein $0 \leq p_R \leq 1$ corresponds to a predetermined restricted-movement probability parameter, and $0 \leq p_F \leq 1$ corresponds to a predetermined free-movement probability parameter, and wherein the detected physical status of the flexible structure corresponds to free-movement status if $R_n$=false, and to restricted-movement status if $R_n$=true.

In a preferred embodiment, adequate values of $p_R$ and $p_F$, in restricted-movement and free-movement status, respectively, are the following:

$$p_R \in [0.75, 0.95],$$

$$p_F \in [0.05, 0.25].$$

More preferably, the values of the mentioned parameters, in restricted-movement and free-movement status, respectively, are:

$$p_R = 0.90,$$

$$p_R = 0.10.$$

The previous step provides a result for the detection of the physical status of the flexible structure, in order to check that the current filtering mode being active in the flight control laws (CLAWs) is the adequate filtering mode.

That is, the main advantage of the proposed first inventive aspect is that it does not require additional measurement sources or elements to detect the transitions from physical free-movement status to restricted-movement status of the flexible structure and vice versa, thus being capable of detecting conditions in which the filtering modes of the flight control laws (CLAWs) need to be configured according to the actual real physical status of the flexible structure.

This results in a highly efficient method, which additionally simplifies the configuration of the system which comprises the flexible structure to be monitored. For example, when the flexible structure is a flying boom, the system is simplified as it does not require a pulse signal generated by the nozzle coil or any additional sensors.

In a particular embodiment, the filtering mode of the flight control laws (CLAWs) is set by means of a binary discrete input signal M, being $M_n$ the $n^{th}$ sample of the M signal defined as:

$M_n$=0 sets the filtering mode to free-movement filtering mode, or $M_n$=1 sets the filtering mode to restricted-movement filtering mode.

That is, the flight control laws (CLAWs), and particularly the filtering modes of the flight control laws (CLAWs) which rule the filtering strategy applied to the feedback signals, are set according to a binary discrete input signal M, such that the two possible physical statuses of the flexible structure are defined.

The binary discrete input signal M can be linked to the Boolean signal $R_n$ to automatically set the proper filtering mode of the flight control laws (CLAWs) according to the detected physical status of the flexible structure defined by $R_n$.

In a more particular embodiment, the method further comprises the step g) of updating the flight control laws' (CLAWs) filtering mode already set as follows:

If $R_n$=true, the filtering mode is switched to the restricted-movement filtering mode by setting the $n^{th}$ sample of the input signal $M_n$ to one ($M_n$=1), If $R_n$=false, the filtering mode is switched to the free-movement filtering mode by setting the $n^{th}$ sample of the input signal $M_n$ to zero ($M_n$=0).

Thus, according to the present step, the current status of the flexible structure, either free-movement or restricted-movement, is detected according to steps a) to f) of the method of the first inventive aspect.

In case of mismatch between such detected physical status and the filtering mode of the flight control laws (CLAWs) being active, an automatic switch to the proper filtering mode is made, so as to grant that the filtering of the feedback signals used in the controllers of the flight control laws is done appropriately and coherently according to the current detected physical status of the flexible status, thus avoiding any problem related with the control of the flexible structure that might appear in Filtering Mode Mismatch (FMM) conditions.

In a particular embodiment, the first and second notch-filters $NF_F$ and $NF_R$ present in step c) are parametric notch-filters applied to signals $\gamma_n^{1F}$ and $\gamma_n^{1R}$ with respective notch-frequencies coincident with $\hat{\omega}_n^{1F}$ and $\omega_n^{1R}$, which refer to the $n^{th}$ sample of the first elastic mode (i=1) estimated frequencies in free-movement status and restricted-movement status respectively, wherein the parametric transfer functions of these notch-filters in the $z^{-1}$ plane are:

$$NF_F=NF(z^{-1};\hat{\omega}_n^{1R}),$$

$$NF_R=NF(z^{-1};\hat{\omega}_n^{1F}),$$

wherein NF denotes the discrete transfer function of the parametric first and second notch-filters in the $z^{-1}$ plane.

In a particular embodiment, filters such as second order notch filters are adequate for the present conditioning.

In a more particular embodiment, the $n^{th}$ sample of the first elastic mode (i=1) estimated activity signals $\hat{\gamma}^{1F}$ and $\hat{\gamma}^{1R}$, referred by $\hat{\gamma}_n^{1F}$ and $\hat{\gamma}_n^{1R}$ are obtained as follows:

$$\hat{\gamma}_n^{1F}=BP(z^{-1};\hat{\omega}_n^{1F})(1-\hat{K}_n^{1F})(y_n^A-y_n^B),$$

$$\hat{\gamma}_n^{1R}=BP(z^{-1};\hat{\omega}_n^{1R})(1-\hat{K}_n^{1R})(y_n^A-y_n^B),$$

being BP the discrete transfer function of a band-pass filter with a parametric band-pass frequency, and $\hat{K}_n^{1F}$ and $\hat{K}_n^{1R}$ denoting the estimated perfect cancellation parameters of the first elastic mode in free-movement and restricted-movement status respectively.

The present generic band-pass filter provides the estimated activity signals of step b) of the present method.

In a particular embodiment, step a) further comprises sampling a third discrete-time scalar signal L containing the measured shape of the flexible structure, being $L_n$ the $n^{th}$ sample of the L signal provided by a third active measurement source (C), this sampling being performed with a sample time $\Delta t$, and the $n^{th}$ sample of a signal being $n \in \mathbb{N}^+$: $n \in [1, \infty)$.

This additional signal L provides information related to the current shape and morphology of the flexible structure, which can modify its configuration over time, and thus its elastic characteristics.

In a particular embodiment, the $n^{th}$ sample of the first elastic mode (i=1) estimated frequencies in free-movement status and restricted-movement status, correspondent with $\hat{\omega}_n^{1F}$ and $\hat{\omega}_n^{1R}$, can be obtained using functions $\hat{\omega}^{1F}(L_n)$ and $\hat{\omega}^{1R}(L_n)$ that provide a mapping between the $n^{th}$ sample of the flexible structure measured shape parameter $L_n$ and the aforementioned frequencies. Thus $\hat{\omega}_n^{1F}$ and $\hat{\omega}_n^{1R}$ are computed as follows:

$$\hat{\omega}_n^{1F}=\hat{\omega}^{1F}(L_n),$$

$$\hat{\omega}_n^{1R}=\hat{\omega}^{1R}(L_n).$$

These mapping functions, $\hat{\omega}^{1F}(L_n)$ and $\hat{\omega}^{1R}(L_n)$, provide information about the evolution of the frequency of the first elastic mode (i=1) for free-movement status ($\hat{\omega}_n^{1F}$) and for restricted-movement status ($\omega_n^{1R}$) as a function of the current flexible structure geometry, which in turn is unequivocally defined by the discrete time scalar signal L provided by the active measurement source C.

Mapping functions $\hat{\omega}^{1F}(L_n)$ and $\overline{\omega}^{1R}(L_n)$ can be obtained using any of the following procedures:

Aeroelastic analyses based on doublet lattice and finite elements methods and tools, Ground vibration tests, or Real-time frequency estimators (i.e., adaptive notch filter estimators).

In a particular embodiment, the perfect cancellation parameters $\hat{K}_n^{1F}$ and $\hat{K}_n^{1R}$ of the first elastic mode (i=1) in free-movement and restricted-movement status respectively shall be obtained by estimation of the first elastic mode unitary displacement functions for free-movement status $\varphi^{1F}(x, L_n)$ and for restricted-movement status $\varphi^{1R}(x, L_n)$, wherein $x \in \mathbb{R}^3$ denotes a 3D coordinate vector of a generic point of the flexible structure. The 3D coordinate vector therefore defines any point of the flexible structure by means of the three coordinates available in $\mathbb{N}^3$.

The relationship between the unitary displacement functions at $x_A$ and $x_B$ (representing the location of the active measurement sources A and B respectively in the elastic structure), $\varphi^{1F}(x_A, L_n)/\varphi^{1F}(x_B, L_n)$ and $\varphi^{1R}(x_A, L_n)/\varphi^{1R}(x_B, L_n)$, can be obtained either by:

Aeroelastic analyses based on doublet lattice and finite elements methods and tools, or Ground vibration tests, or Real-time elastic mode unitary displacement estimators.

Once the relationship between the unitary displacement functions $\varphi^{1F}(x_A, L_n)/\varphi^{1F}(x_B, L_n)$ and $\varphi^{1R}(x_A, L_n)/\varphi^{1R}(x_B, L_n)$, have been obtained by any of the previous means, the perfect cancellation parameters can be computed as follows:

$$\hat{K}_n^{1F} = \frac{1}{1 - \varphi^{1F}(x_A, L_n)/\varphi^{1F}(x_B, L_n)},$$

$$\hat{K}_n^{1R} = \frac{1}{1 - \varphi^{1R}(x_A, L_n)/\varphi^{1R}(x_B, L_n)}.$$

A second inventive aspect of the invention provides a computer program comprising a computer program code, which, when executed by a computer device, causes the computer device to carry out all the method steps of the first inventive aspect.

This allows the performance by means of any computer device of the present method for detecting the physical status of a flexible structure.

In a third inventive aspect, the invention provides a system comprising a flexible structure and a computer device, the computer device being configured to apply a method for detecting a physical status of a flexible structure, the physical status being either free-movement or restricted-movement, according to the first inventive aspect. The physical status is detected by the method according to the first inventive aspect.

In a particular embodiment, the flexible structure is a flying boom so that the free-movement physical status corresponds to the free-air status of the flying boom, and the restricted-movement physical status corresponds to the flying boom status being coupled to or in contact with the slipway of a receptacle of a receiver aircraft.

In a fourth inventive aspect, the present invention provides an aircraft comprising a system according to the third inventive aspect. More particularly, the aircraft is a tanker aircraft and the flexible structure of the system is a flying boom.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The present invention firstly discloses a method for detecting the physical status, which can be a free-movement or restricted-movement status, of a flexible structure.

Figure 1:
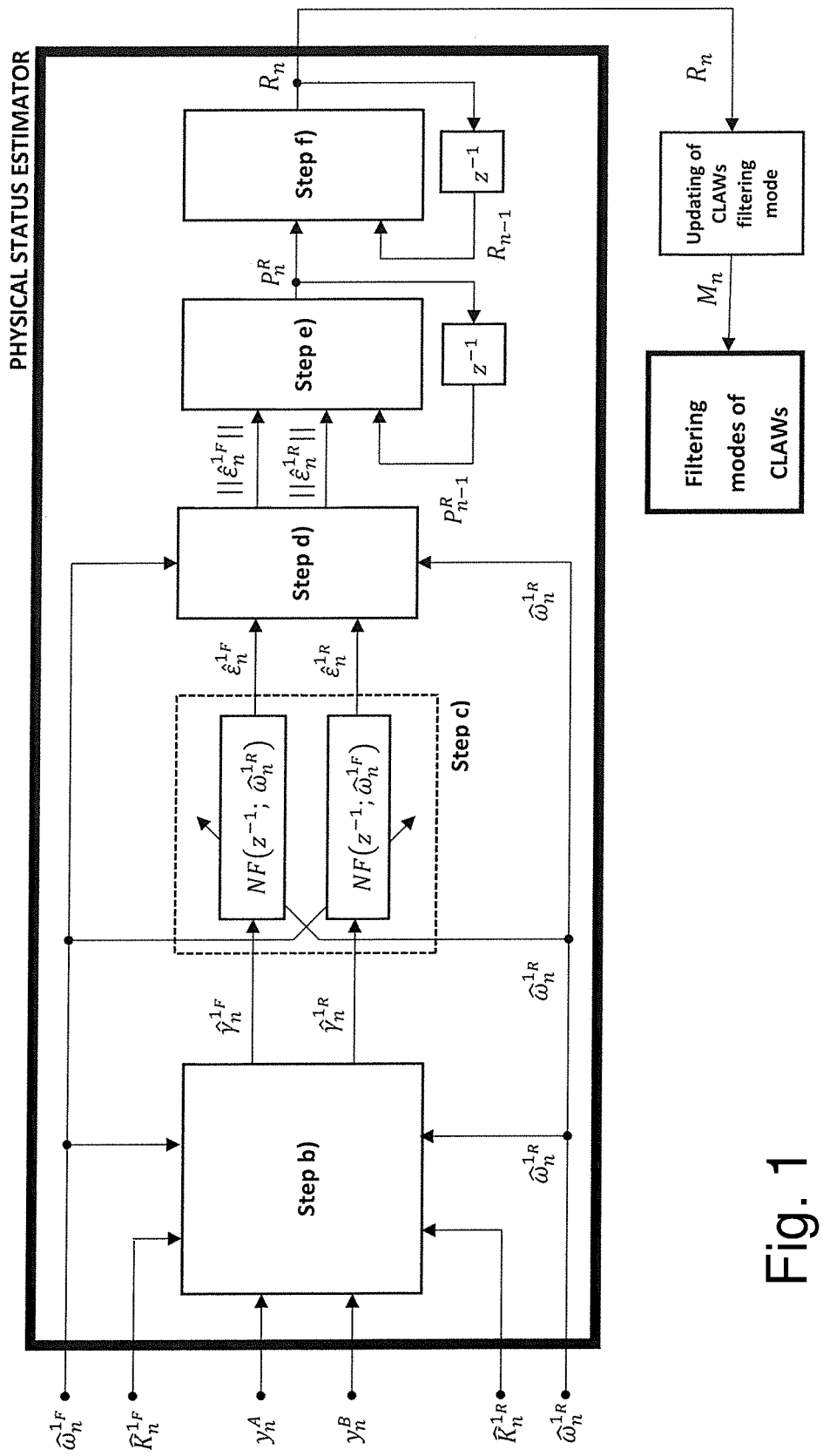
FIG. 1 shows a diagram with the steps of a method for detecting the physical status of a flexible structure according to an embodiment of the present invention.

FIG. 1 shows a diagram with the steps of a particular embodiment of the present method to detect the physical status (free-movement, restricted movement) of a flexible structure. This flexible structure has time-varying elastic characteristics with a total number $N \in \mathbb{N}^+$ of elastic modes, wherein i is a generic elastic mode, $i \in \mathbb{N}^+ : i \in [1, N]$.

As it can be observed, the $n^{th}$ sample $y_n^A$ and $y_n^B$ of two discrete-time scalar signals $y^A$ and $y^B$, from first (A) and second (B) sensors, are supplied to obtain in step b) the in order to obtain first elastic mode (i=1) estimated activity signal $\hat{\gamma}_n^{1F}$ in free-movement status and first elastic mode (i=1) estimated activity signal $\hat{\gamma}_n^{1R}$ in restricted-movement status. The signals $y^A$ and $y^B$ contain the measured dynamics of the flexible structure.

Moreover, the $n^{th}$ sample $L_n$ of another discrete-time scalar signal L, from a third sensor (C), is further supplied to obtain in step b) the signals $\hat{\gamma}_n^{1F}$ and $\hat{\gamma}_n^{1R}$. The signal L contains the measured shape of the flexible structure.

Both signals $y^A$ and $y^B$ and signal L are sampled in step a) (not shown in FIG. 1) with a sample time $\Delta t$, and wherein the $n^{th}$ sample of each signal is $n \in \mathbb{N}^+$: $n \in [1, \infty)$.

Furthermore, the notch-frequencies of free-movement and restricted-movement, $\hat{\omega}_n^{1F}$ and $\hat{\omega}^{1R}$ respectively, at the $n^{th}$ sample are also supplied in step b) for obtaining the signals $\hat{\gamma}_n^{1F}$ and $\hat{\gamma}_n^{1R}$. These frequencies are obtained by computing:

$$\hat{\omega}_n^{1F} = \hat{\omega}^{1F}(L_n),$$

$$\hat{\omega}_n^{1R} = \hat{\omega}^{1R}(L_n).$$

In a particular example, step b) further comprises computing:

$$\hat{\gamma}_n^{iF} = BP(z^{-1}; \hat{\omega}_n^{1F})(1 - \hat{K}_n^{1F})(y_n^A - y_n^B),$$

$$\hat{\gamma}_n^{iR} = BP(z^{-1}; \hat{\omega}_n^{1R})(1 - \hat{K}_n^{1R})(y_n^A - y_n^B),$$

BP is the discrete transfer function of a band-pass filter whit a parametric band-pass frequency.

$\hat{K}_n^{1F}$ and $\hat{K}_n^{1R}$ denote estimated perfect cancellation parameters of the first elastic mode (i=1) in free-movement and restricted-movement status respectively. The perfect cancellation parameters are obtained by estimations of the first elastic mode unitary displacement functions for free-movement status $\varphi^{1F}(x, L_n)$ and for restricted-movement status $\varphi^{1R}(x, L_n)$. $x \in \mathbb{R}^3$ is the 3D coordinate vector of a generic point of the flexible structure.

These perfect cancellation parameters are computed as follows:

$$\hat{K}_n^{1F} = \frac{1}{1 - \varphi^{1F}(x_A, L_n)/\varphi^{1F}(x_B, L_n)},$$

$$\hat{K}_n^{1R} = \frac{1}{1 - \varphi^{1R}(x_A, L_n)/\varphi^{1R}(x_B, L_n)}.$$

The location of the first A and second B sensor in the flexible structure are represented by the expression shown above $x_A$ and $x_B$.

Once the first elastic mode (i=1) estimated activity signals $\hat{\gamma}_n^{1F}$ and $\hat{\gamma}_n^{1R}$ are obtained in step b), the estimated isolated free-movement and restricted-movement first elastic mode excitation signals are obtained be means of a first and second notch filters. These first elastic mode excitation signals are $\hat{\varepsilon}_n^{1F}$ and $\hat{\varepsilon}_n^{1R}$ and can be computed by the following expressions:

$$\hat{\varepsilon}_n^{1F} = NF_F \hat{\gamma}_n^{1F},$$

$$\hat{\varepsilon}_n^{1R} = NF_R \hat{\gamma}_n^{1R},$$

The $NF_F$ and $NF_R$ denotes the discrete transfer functions of the first and second notch filters. These notch filters are parametric notch-filters that are applied to signals $\hat{\gamma}_n^{1F}$ and $\hat{\gamma}_n^{1R}$ with respective notch-frequencies $\hat{\omega}_n^{1R}$ and $\hat{\omega}_n^{1F}$. The parametric transfer functions of the notch-filters in the $z^{-1}$ plane are:

$$NF_F = NF(z^{-1}; \hat{\omega}_n^{1R}),$$

$$NF_R = NF(z^{-1}; \hat{\omega}_n^{1F}),$$

The discrete transfer function of the parametric first and second notch-filters in the $z^{-1}$ plane is expressed by NF.

The method continues with step d) where the amplitude $\|\hat{\varepsilon}_n^{1F}\|$ and $\|\hat{\varepsilon}_n^{1R}\|$ of the isolated elastic mode excitation signals $\hat{\varepsilon}_n^{1F}$ and $\hat{\varepsilon}_n^{1R}$ are estimated by amplitude demodulation.

Once the amplitude $\|\hat{\varepsilon}_n^{1F}\|$ and $\|\hat{\varepsilon}_n^{1R}\|$ are estimated, the estimated probability $p_n^R$ of the flexible structure to be in a restricted-movement status is recursively computed according to step e). This estimated probability is defined as:

$$p_n^R = \max(0, \min(1, p_{n-1}^R + (\lambda \cdot U_n))).$$

For the above estimated probability, λ is an update gain constant with λ>0, and $P_{n-1}^R$ is a previous value of the estimated probability of the flexible structure in a restricted-movement status at the (n−1)$^{th}$ sample. Therefore, when n=1; then $P_{n-1}^R$=0 (being this the first time that the step e) of the method is applied).

Furthermore, $U_n$ is defined as the following expression:

$$U_n=(\|\hat{\epsilon}_n^{1F}\|-\|\hat{\epsilon}_n^{1R}\|)^2 P_{n-1}^R - \|\hat{\epsilon}_n^{1R}\|(\|\hat{\epsilon}_n^{1F}\|-\|\hat{\epsilon}_n^{1R}\|),$$

For detecting if the flexible structure is in a free-movement status or restricted-movement status in step f), a discrete state Boolean signal $R_n$ is recursively computed at the n$^{th}$ sample as follows:
- if $P_n^R \geq p_R$ and $R_{n-1}$=false, then $R_n$=true being the flexible structure in the restricted-movement status, otherwise $R_n$=false or
- if $P_n^R \leq p_F$ and $R_{n-1}$=true, then $R_n$=false being the flexible structure in the free-movement status, otherwise $R_n$=true.

$R_{n-1}$ is a previous value of the discrete state Boolean signal at the (n−1)$_{th}$ sample, and when n=1, it is the first time that the step f) of the method is applied, and therefore, $R_{n-1}$=false. This implies that the flexible structure is in a free-movement status.

$p_R$ is a predetermined restricted-movement probability parameter and must be greater than 0 and lower than 1; and $p_F$ is a predetermined free-movement probability parameter and must be greater or equal to 0 and lower or equal to 1. In a particular example, $p_R \in [0.75, 0.95]$ and $p_F \in [0.05, 0.25]$.

Therefore, when $R_n$=false, then the flexible structure is in a free-movement status; and when $R_n$=true, then the flexible structure is in a restricted movement.

The flexible structure is controlled by flight control laws (CLAWs) that comprise specific filtering modes for free-movement or restricted-movement status. Particularly, the filtering mode of the CLAWs is set by means of a binary discrete input signal M. The n$^{th}$ sample $M_n$ of the M signal is defined as:
- $M_n$=0 sets the filtering mode to free-movement filtering mode, or
- $M_n$=1 sets the filtering mode to restricted-movement filtering mode.

Furthermore, the present method comprises the step g) where the filtering mode is set as follows:
- $R_n$=true, the filtering mode is switched to the restricted-movement filtering mode by setting the n$^{th}$ sample of the input signal $M_n$ to one ($M_n$=1),
- If $R_n$=false, the filtering mode is switched to the free-movement filtering mode by setting the n$^{th}$ sample of the input signal $M_n$ to zero ($M_n$=0).

Figure 2:
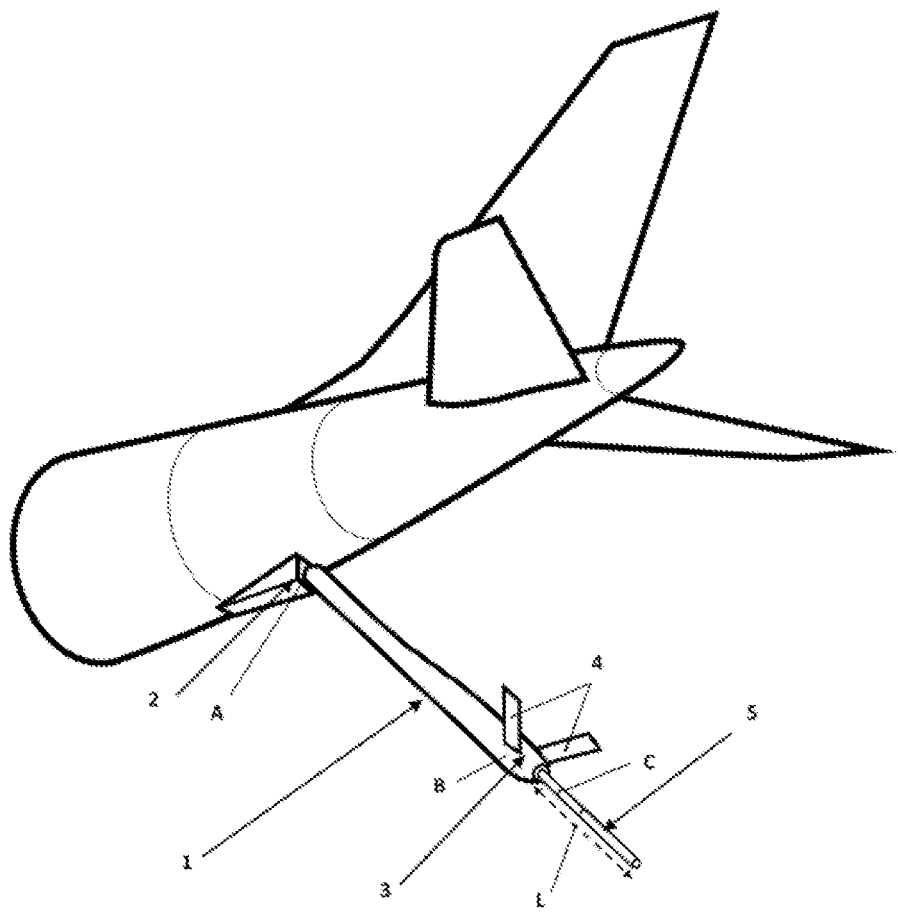
FIG. 2 shows a particular embodiment of a flying boom of a tanker aircraft on which the method for detecting the physical status of this flying boom of the present invention is applied.

FIG. 2 shows a particular example of a flying boom (1) of a tanker aircraft, particularly a zoom of the tail cone area of a tanker aircraft with the flying boom (1) deployed. This flying boom (1) comprises two active measurement sources, which correspond to a first sensor (A) and a second sensor (B). In particular, the first sensor (A) is a ball joint angle sensor located on the gimballed attachment (2) of the flying boom (1) to the tanker aircraft; and the second sensor (B) is an Inertial Measurement Unit (IMU) that is located in the bulb (3) of the flying boom (1) close to the hinge of the control surfaces (4).

The first sensor (A) provides a first discrete-time scalar signal y$^A$ and the second sensor (B) provides a second discrete-time scalar signal y$^B$. Both signals contain the dynamics of the flying boom (1) measured at different locations; the dynamics defined wither by angular orientation, angular rates or angular accelerations of the flying boom (1).

The elastic modes shapes and undamped elastic modes frequencies of the flying boom (1) flexible structure suffer large variations derived from fast changes in the exogenous boundary conditions acting on the nozzle. In this particular case of a flying boom (1), these changes in the exogenous boundary conditions occur during transitions from free-movement status to restricted-movement status of the flying boom (1) flexible structure and vice versa.

For detecting the physical status of the flying boom (1) according to the present method, signals y$^A$ and y$^A$ are sampled with a sample time Δt so that $y_n^A$ and $y_n^B$ are the n$^{th}$ sample of the respective signal provided by the first (A) and second (B) sensor and $n \in \mathbb{N}^+ : n \in [1, \infty)$.

This flying boom (1) further comprises a third active measurement source corresponding to a third sensor (C). In particular, this third sensor (C) is a potentiometer located in the telescopic beam (5) which measures the length (L) of the beam section that is cantilevered and exposed to the air free stream.

This third sensor (C) provides a third discrete-time scalar signal L which provides information related to the current shape and morphology of the flying boom (1), particularly, the length (L) of the telescopic beam (5) section that is cantilevered and exposed to the air free stream that changes its configuration over time with extension or retraction movements.

From the signals measured by at least the first (A), the second (B) and the third (C) sensors arranged along the flying boom (1) structure, the present method is able to detect the physical status of the flying boom (1), and thus, it is able to detect if there is any mismatch between the actual physical status of the flying boom (1) and the filtering mode of the flight control laws (CLAWs).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for detecting a physical status of a flexible structure, said flexible structure being an external component of an aircraft which comprises a first sensor and a second sensor, said status being either free-movement or restricted-movement, the flexible structure having time-varying elastic characteristics, with a total number $N \in \mathbb{N}^+$ of elastic modes, wherein i is a generic elastic mode, $i \in \mathbb{N}^+ : i \in [1, N]$, and the flexible structure being controlled by flight control laws (CLAWs), these CLAWs comprising specific filtering modes for free-movement or restricted-movement status, the method comprising:

a) sampling a first and a second discrete-time scalar signal y$^A$ and y$^B$ containing measured dynamics of the flexible structure which are provided by the first sensor and the second sensor, respectively, wherein $y_n^A$ and $y_n^B$ are an $n^{th}$ sample of a respective signal provided by a first (A) and second (B) active measurement source, this sampling being performed with a sample time $\Delta t$, and the $n^{th}$ sample of a signal being $n \in \mathbb{N}^+ : n \in [1, \infty)$, b) obtaining from the first and second $y_n^A$ and $y_n^B$ sampled signals:
first elastic mode (i=1) estimated activity signal $\hat{\gamma}_n^{1F}$ in free-movement status,
first elastic mode (i=1) estimated activity signal $\hat{\gamma}n^{1R}$ in restricted-movement status, c) obtaining the estimated isolated free-movement and restricted-movement first elastic mode excitation signals, $\hat{\epsilon}_n^{1F}$ and $\hat{\epsilon}_n^{1R}$ respectively from the signals $\hat{\gamma}_n^{1F}$ and $\hat{\gamma}_n^{1R}$, by means of a first and second notch filters, where $\hat{\epsilon}_n^{1F}$ and $\hat{\epsilon}_n^{1R}$ are:

$\hat{\epsilon}_n^{1F} = NF_F \hat{\gamma}_n^{1F}$, $\hat{\epsilon}_n^{1R} = NF_R \hat{\gamma}_n^{1R}$, wherein $NF_F$ and $NF_R$ denote discrete transfer functions of notch-filters, d) estimating an amplitude $\|\hat{\epsilon}_n^{1F}\|$ and $\|\hat{\epsilon}_n^{1R}\|$ of the isolated elastic mode excitation signals $\hat{\epsilon}_n^{1F}$ and $\hat{\epsilon}_n^{1R}$ by amplitude demodulation, e) recursively computing an estimated probability $P_n^R$ of the flexible structure to be in a restricted-movement status, wherein $P_n^R \in \mathbb{R} \in [0, 1]$ and is defined as:

$P_n^R = \max(0, \min(1, P_{n-1}^R + (\lambda \cdot U_n)))$, wherein $\lambda$ is an update gain constant being $\lambda > 0$, and $P_{n-1}^R$ is a previous value of the estimated probability of the flexible structure in a restricted-movement status at the $(n-1)^{th}$ sample, wherein when n=1; then $P_{n-1}^R = 0$, the step e) of the method is applied for a first time,
wherein $U_n$ is defined as follows:

$U_n = (\|\hat{\epsilon}_n^{1F}\| - \|\hat{\epsilon}_n^{1R}\|)^2 P_{n-1}^R - \|\hat{\epsilon}_n^{1R}\|(\|\hat{\epsilon}_n^{1F}\| - \|\hat{\epsilon}_n^{1R}\|)$, f) detecting the physical status of the flexible structure by recursively computing a discrete state Boolean signal $R_n$ at the $n^{th}$ sample, wherein $R_{n-1}$ is a previous value of the discrete state Boolean signal at the $(n-1)^{th}$ sample, wherein when n=1, wherein when the step f) of the method is applied for the first time, then $R_{n-1}$=false, and the flexible structure is in free-movement status, and
the discrete state Boolean signal $R_n$ being recursively computed as follows:
if $P_n^R \geq p_R$ and $R_{n-1}$=false, then $R_n$=true and the flexible structure is in the restricted-movement status, otherwise $R_n$=false or
if $P_n^R \leq p_F$ and $R_{n-1}$=true, then $R_n$=false and the flexible structure is in the free-movement status, otherwise $R_n$=true,
wherein $0 \leq p_R \leq 1$ corresponds to a predetermined restricted-movement probability parameter, and $0 \leq p_F \leq 1$ corresponds to a predetermined free-movement probability parameter, and
wherein the detected physical status of the flexible structure corresponds to free-movement status if $R_n$=false, and to restricted-movement status if $R_n$=true.

2. The method according to claim 1, wherein the filtering mode of the flight control laws (CLAWs) is set by means of a binary discrete input signal M, wherein $M_n$ is an $n^{th}$ sample of the M signal defined as:
$M_n$=0 sets the filtering mode to free-movement filtering mode, or
$M_n$=1 sets the filtering mode to restricted-movement filtering mode.

3. The method according to claim 2 further comprising a step g) of updating the already set filtering mode as follows:
if $R_n$=true, the filtering mode is switched to the restricted-movement filtering mode by setting the $n^{th}$ sample of the input signal $M_n$ to one ($M_n$=1),
if $R_n$=false, the filtering mode is switched to the free-movement filtering mode by setting the $n^{th}$ sample of the input signal $M_n$ to zero ($M_n$=0).

4. The method according to claim 1,
wherein the first and second notch-filters $NF_F$ and $NF_R$ present in step c) are parametric notch-filters applied to signals $\hat{\gamma}_n^{1F}$ and $\hat{\gamma}_n^{1R}$ with respective notch-frequencies coincident with frequencies $\hat{\omega}_n^{1RR}$ and $\hat{\omega}_n^{1F}$ at the $n^{th}$ sample,
wherein the parametric transfer functions of these notch-filters in a $z^{-1}$ plane are:

$NF_F = NF(z^{-1}; \hat{\omega}_n^{1R})$, $NF_R = NF(z^{-1}; \hat{\omega}_n^{1F})$, wherein NF denotes the discrete transfer function of the parametric first and second notch-filters in the $z^{-1}$ plane.

5. The method according to claim 4, wherein the $n^{th}$ sample of the estimated first elastic mode (i=1) activity signal $\hat{\gamma}_n^{1F}$ in free-movement status and the $n^{th}$ sample of the estimated first elastic mode (i=1) activity signal $\hat{\gamma}_n^{1R}$ in restricted-movement status obtained in step b) fulfill:

$\hat{\gamma}_n^{iF} = BP(z^{-1}; \hat{\omega}_n^{1F})(1 - \hat{K}_n^{1F})(y_n^A - y_n^B)$, $\hat{\gamma}_n^{iR} = BP(z^{-1}; \hat{\omega}_n^{1R})(1 - \hat{K}_n^{1R})(y_n^A - y_n^B)$, wherein BP is a discrete transfer function of a band-pass filter with a parametric band-pass frequency, and $\hat{K}_n^{1F}$ and $\hat{K}_n^{1R}$ denoting estimated perfect cancellation parameters of the first elastic mode (i=1) in free-movement and restricted-movement status respectively.

6. The method according to claim 4,
wherein step a) further comprises sampling a third discrete-time scalar signal L containing a measured shape of the flexible structure, wherein $L_n$ is the $n^{th}$ sample of the L signal provided by a third active measurement source (C), this sampling being performed with a sample time $\Delta t$, and the $n^{th}$ sample of a signal being $n \in \mathbb{N}^+ : n \in [1, \infty)$,
wherein the notch-frequencies at the $n^{th}$ sample, correspondent with the free-movement and restricted-movement status, $\hat{\omega}_n^{1F}$ and $\hat{\omega}_n^{1R}$, are obtained by computing mapping functions:

$\hat{\omega}_n^{1F} = \hat{\omega}^{1F}(L_n)$, $\hat{\omega}_n^{1R} = \hat{\omega}^{1R}(L_n)$;

wherein, the mapping functions $\hat{\omega}^{1F}(L_n)$ and $\hat{\omega}^{1R}(L_n)$ are obtained using one of:
aeroelastic analyses based on doublet lattice and finite elements methods and tools,
ground vibration tests, or
real-time frequency estimators.

7. The method according to claim 4,
wherein step a) further comprises sampling a third discrete-time scalar signal L containing a measured shape of the flexible structure, wherein $L_n$ is the $n^{th}$ sample of the L signal provided by a third active measurement source (C), this sampling being performed with a sample time $\Delta t$, and the $n^{th}$ sample of a signal being $n \in \mathbb{N}^+ : n \in [1, \infty)7$, wherein perfect cancellation parameters $\hat{K}_n^{1F}$ and $\hat{K}_n^{1R}$, are obtained by estimations of first elastic mode unitary displacement functions for free-movement status $\varphi^{1F}(x, L_n)$ and for restricted-movement status $\varphi^{1R}(x, L_n)$, where $x \in \mathbb{R}^3$ denotes a 3D coordinate vector of a generic point of the flexible structure, wherein the perfect cancellation parameters are computed as follows:

$$\hat{K}_n^{1F} = \frac{1}{1 - \varphi^{1F}(x_A, L_n)/\varphi^{1F}(x_B, L_n)},$$

$$\hat{K}_n^{1R} = \frac{1}{1 - \varphi^{1R}(x_A, L_n)/\varphi^{1R}(x_B, L_n)}.$$

where $x_A$ and $x_B$ represent a location of the active measurement sources (A) and (B) respectively in the flexible structure, and being the relationships between the unitary displacement functions, $\varphi^{1F}(x_A, L_n)/\varphi^{1F}(x_B, L_n)$ and $\varphi^{1R}(x_A, L_n)/\varphi^{1R}(x_B, L_n)$ obtained by one of:
- aeroelastic analyses based on doublet lattice and finite elements methods and tools,
- ground vibration tests, or
- real-time elastic mode unitary displacement estimators.

8. The method according to claim 1, wherein the amplitude demodulation of step d) is performed with a third parametric notch-filter applied to the signal $\hat{\varepsilon}_n^{1F}$ with a notch frequency of $2\hat{\omega}_n^{1F}$ and a fourth parametric notch-filter applied to the signal $\hat{\varepsilon}_n^{1R}$ with a notch frequency of $2\hat{\omega}_n^{1R}$, wherein the estimated amplitudes are computed as:

$$\|\hat{\varepsilon}_n^{1F}\| = \sqrt{2(\hat{\varepsilon}_n^{1F})^2 NF(z^{-1}; 2\hat{\omega}_n^{1F})},$$

$$\|\hat{\varepsilon}_n^{1R}\| = \sqrt{2(\hat{\varepsilon}_n^{1R})^2 NF(z^{-1}; 2\hat{\omega}_n^{1R})},$$

wherein NF is the discrete transfer function of the parametric third and fourth notch-filters in a $z^{-1}$ plane.

9. The method according to claim 1, wherein the restricted-movement and free-movement probability parameters $p^R$ and $p^F$ of step f) are $p^R \in [0.75, 0.95]$ and $p^F \in [0.05, 0.25]$.

10. The method according to claim 1, wherein step a) further comprises sampling a third discrete-time scalar signal L containing a measured shape of the flexible structure, wherein $L_n$ is the $n^{th}$ sample of the L signal provided by a third active measurement source (C), this sampling being performed with a sample time $\Delta t$, and the $n^{th}$ sample of a signal being $n \in \mathbb{N}^+ : n \in [1, \infty)$.

11. A non-transitory computer readable recording medium containing instructions which, when executed by a computer device, causes the computer device to carry out all the method steps of claim 1.

12. A system comprising the flexible structure and a computer device, the computer device being configured to apply a method for computing a probability of a flexible structure to be in a physical status, said physical status being either free-movement or restricted-movement, according to claim 1.

13. The system according to claim 12, wherein the flexible structure is a flying boom so that the free-movement physical status corresponds to a free-air status of the flying boom, and the restricted-movement physical status corresponds to a coupled status of the flying boom with a receiver aircraft.

14. A system comprising a flexible structure and a computer device, the computer device being configured to apply a method for computing a probability of a flexible structure to be in a physical status, said physical status being either free-movement or restricted-movement, the flexible structure having time-varying elastic characteristics, with a total number $N \in \mathbb{N}^+$ of elastic modes, wherein i is a generic elastic mode, $i \in \mathbb{N}^+ : i \in [1, N]$, and the flexible structure being controlled by flight control laws (CLAWs), these CLAWs comprising specific filtering modes for free-movement or restricted-movement status, wherein the flexible structure is a flying boom of an aircraft so that the free-movement physical status corresponds to a free-air status of the flying boom, and the restricted-movement physical status corresponds to a coupled status of the flying boom with a receiver aircraft, the method comprising:

a) sampling a first and a second discrete-time scalar signal $y^A$ and $y^B$ containing measured dynamics of the flexible structure, wherein $y_n^A$ and $y_n^B$ are an $n^{th}$ sample of a respective signal provided by a first (A) and second (B) active measurement source, this sampling being performed with a sample time $\Delta t$, and the $n^{th}$ sample of a signal being $n \in \mathbb{N}^+ : n \in [1, \infty)$, b) obtaining from the first and second $y_n^A$ and $y_n^B$ sampled signals:
- first elastic mode (i=1) estimated activity signal $\hat{\gamma}_n^{1F}$ in free-movement status,
- first elastic mode (i=1) estimated activity signal $\hat{\gamma}_n^{1R}$ in restricted-movement status, c) obtaining the estimated isolated free-movement and restricted-movement first elastic mode excitation signals, $\hat{\varepsilon}_n^{1F}$ and $\hat{\varepsilon}_n^{1R}$ respectively from the signals $\hat{\gamma}_n^{1F}$ and $\hat{\gamma}_n^{1R}$, by means of a first and second notch filters, where $\hat{\varepsilon}_n^{1F}$ and $\hat{\varepsilon}_n^{1R}$ are:

$$\hat{\varepsilon}_n^{1F} = NF_F \hat{\gamma}_n^{1F},$$

$$\hat{\varepsilon}_n^{1R} = NF_R \hat{\gamma}_n^{1R},$$

wherein $NF_F$ and $NF_R$ denote discrete transfer functions of notch-filters, d) estimating an amplitude $\|\hat{\varepsilon}_n^{1F}\|$ and $\|\hat{\varepsilon}_n^{1R}\|$ of the isolated elastic mode excitation signals $\hat{\varepsilon}_n^{1F}$ and $\hat{\varepsilon}_n^{1R}$ by amplitude demodulation, e) recursively computing an estimated probability $P_n^R$ of the flexible structure to be in a restricted-movement status, wherein $P_n^R \in \mathbb{R} \in [0, 1]$ and is defined as:

$$P_n^R = \max(0, \min(1, P_{n-1}^R + (\lambda \cdot U_n))),$$

wherein $\lambda$ is an update gain constant being $\lambda > 0$, and $P_{n-1}^R$ is a previous value of the estimated probability of the flexible structure in a restricted-movement status at the $(n-1)^{th}$ sample, wherein when n=1; then $P_{n-1}^R = 0$, the step e) of the method is applied for a first time, wherein $U_n$ is defined as follows:

$$U_n = (\|\hat{\varepsilon}_n^{1F}\| - \|\hat{\varepsilon}_n^{1R}\|)^2 P_{n-1}^R - \|\hat{\varepsilon}_n^{1R}\| (\|\hat{\varepsilon}_n^{1F}\| - \|\hat{\varepsilon}_n^{1R}\|),$$

f) detecting the physical status of the flexible structure by recursively computing a discrete state Boolean signal $R_n$ at the $n^{th}$ sample, wherein $R_{n-1}$ is a previous value of the discrete state Boolean signal at the $(n-1)^{th}$ sample, wherein when n=1, wherein when the step f) of the method is applied for the first time, then $R_{n-1}$=false, and the flexible structure is in free-movement status, and the discrete state Boolean signal $R_n$ being recursively computed as follows:
- if $P_n^R \geq p_R$ and $R_{n-1}$=false, then $R_n$=true and the flexible structure is in the restricted-movement status, otherwise $R_n$=false or if $P_n^R \leq p_F$ and $R_{n-1}$=true, then $R_n$=false and the flexible structure is in the free-movement status, otherwise $R_n$=true, wherein $0 \leq p_R \leq 1$ corresponds to a predetermined restricted-movement probability parameter, and $0 \leq p_F \leq 1$ corresponds to a predetermined free-movement probability parameter, and wherein the detected physical status of the flexible structure corresponds to free-movement status if $R_n$=false, and to restricted-movement status if $R_n$=true.

* * * * *